United States Patent [19]

Curie et al.

[11] Patent Number: 4,862,675
[45] Date of Patent: Sep. 5, 1989

[54] PACKAGING METHOD

[75] Inventors: Kevin J. Curie; Jerry F. Jesse, both of Neenah, Wis.

[73] Assignee: American National Can Company, Greenwich, Conn.

[21] Appl. No.: 176,015

[22] Filed: Apr. 15, 1987

Related U.S. Application Data

[62] Division of Ser. No. 830,412, Feb. 18, 1986, Pat. No. 4,687,688.

[51] Int. Cl.$^4$ .................. B65B 43/04; B65B 43/06
[52] U.S. Cl. .......................... 53/440; 53/452; 53/455
[58] Field of Search ............... 53/452, 453, 455, 434, 53/440, 469, 479, 140, 141

[56] References Cited

U.S. PATENT DOCUMENTS

| 3,088,255 | 5/1963 | Griem | 53/440 X |
|---|---|---|---|
| 3,108,881 | 10/1963 | Shaw et al. | 53/440 X |
| 3,597,237 | 8/1971 | Nughes | 53/440 X |
| 3,892,058 | 7/1975 | Komatsu et al. | 53/440 X |
| 4,402,172 | 9/1983 | Krueger | 53/140 X |
| 4,512,136 | 4/1985 | Christine | 53/455 X |
| 4,769,261 | 9/1988 | Hazelton et al. | 53/455 X |

Primary Examiner—Horace M. Culver
Attorney, Agent, or Firm—Paul R. Audet; Thomas D. Wilhelm

[57] ABSTRACT

A three layer oriented film, packages made from the oriented films, and packaging methods using the oriented film. Each layer of the film is molecularly oriented. A first outer layer of the film is nylon 6. The other outer layer of the film is a blend of 50% to 100% linear low density polyethylene and 50% to 0% low density polyethylene. An intermediate adhesive polymer layer has a high fraction of linear low density polyethylene.

2 Claims, 2 Drawing Sheets

PACKAGING METHOD

This application is a divisional of application Ser. No. 830,412, filed Feb. 18, 1986, now U.S. Pat. No. 4,687,688.

BACKGROUND OF THE INVENTION

This invention pertains to multiple layer films and bags made from multiple layer films. The bags are typically made by heat sealing facing portions of the films to each other about a common periphery to form an enclosure, but leaving one side of the enclosure open. A product is then inserted into the bag and the open side of the bag is sealed closed. The closure of this last side completes the closure of the bag.

For use with some products, it is desired that the packaged product be capable of being boiled, as in boiling water, after the package is sealed closed with the product in it. It is this particular market and problem that the invention addresses.

There are available, to the market, certain sheet structures which are capable of handling boiling temperatures. These include, for example, structures which are made for retort pouch applications. These structures are typically of the order of 6 to 8 mils thick, and may contain a metal foil. Another family of structures, of approximately the same thickness includes an outer layer of nylon, a second layer of ethylene vinyl alcohol, a third layer of nylon, a fourth layer of adhesive, and a fifth layer of a sealant material.

While the above structures may be useful as regards retort pouch applications, they are prohibitively expensive for use with less valuable products. To the present time, it is not seen that there is available a film for making boilable bags at an economical cost, which bags may thus be used for lower priced products.

It is an object of this invention to provide a novel and economical film which can be made into a boilable bag and wherein the contents of the bag may expand significantly at boiling temperatures; the bag being capable of withstanding the boiling process without rupture.

It is a particular object of the invention to provide a package which can be sealed with a moderate amount of gas in it and subsequently boiled without rupture of the bag.

It is yet another object of the invention to provide a method of packaging a product in a bag where it is acceptable to include an amount of air in the bag and where the air does not cause rupture of the bag on subsequent boiling of the bag.

SUMMARY OF THE INVENTION

Certain of these objectives are obtained in a three layer polymeric film wherein all three layers are molecularly oriented. The first layer of the film is oriented nylon 6. The second oriented layer is 50% to 100% linear low density polyethylene and conversely 50% to 0% low density polyethylene, in blend composition. A third oriented layer of an adhesive polymer is disposed between the first and second layers and adheres them to each other. The composition of the third layer has a substantial fraction of linear low density polyethylene in it.

Preferably the film is made by the process of coextrusion of the three layers to form a three layer film, followed by liquid quenching of the three layer film, followed by molecular orientation of the film, and finally heat setting of the oriented film.

Additional objectives of the invention are achieved in bags made from the three layer films, and particularly bags which are capable of being boiled in water for at least about 10 minutes, preferably 20 minutes. Preferably the functional characteristics of the bag are such that when product is inserted into the bag it is entirely acceptable to include low pressure air, such as for example atmospheric pressure, or slightly above, in the bag; and wherein the bag can be boiled and withstand the increased pressure of the expanded hot gases in the bag. Finally the invention is seen to be embodied in a method of packaging a product. The first step in the method is that of coextruding a three layer film by a tubular liquid quench process. It is significant that the film have a first layer of nylon 6, a second layer of a blend of 50% to 100% linear low density polyethylene and conversely 0% to 50% low density polyethylene, and a third adhesive layer between the first and second layers. The adhesive layer has a high fraction of linear low density polyethylene in its composition. The second step is that of molecularly orienting the three layer film. The third step is that of heat setting the oriented film. The fourth step is that of forming a package by sealing portions of the film to each other in face to face relationship about a common area to form a package having one side, or end, left open. The fifth step is that of putting a product in the package with or without the addition of air at low pressure. The sixth step is sealing the package closed. And the seventh step is boiling the sealed package.

DETAILED DESCRIPTION OF THE ILLUSTRATED EMBODIMENTS

Figure 1:
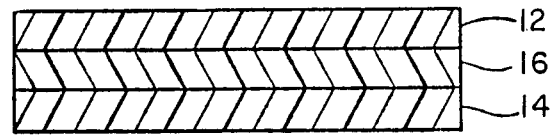
FIG. 1 is a cross-section of a film of this invention.

FIG. 1 shows a cross section of a three layer sheet material used in this invention. Layer 12 is nylon 6 and is used on the outside of the package. Layer 14 is used on the inside of the package. Its composition is 50% to 100% linear low density polyethylene and 0% to 50% low density polyethylene. Layer 16 is an adhesive layer which adheres layers 12 and 14 to each other. Its composition is based on linear low density polyethylene.

Figure 2:
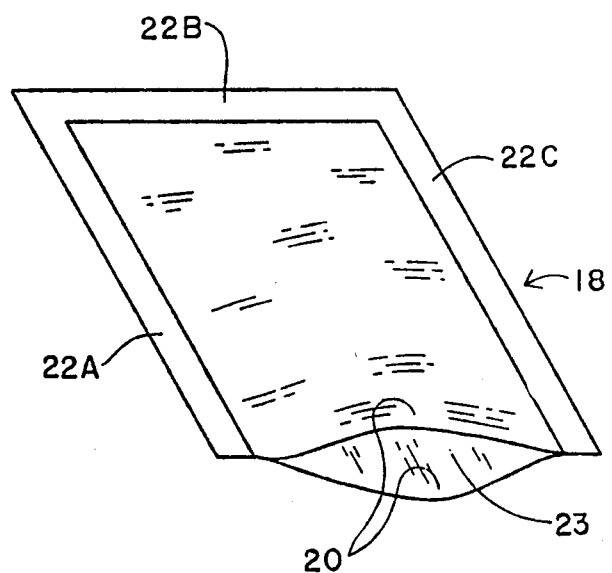
FIG. 2 is a pictorial view of an open package made from films of this invention.

FIG. 2 shows a pouch made of sheet material of this invention, as in FIG. 1. The pouch 18 is formed from either two separate portions 20 of the sheet material, or by folding a piece of the sheet material over onto itself so that the portions thereof are in face to face relationship. Heat seals are then formed as at 22A, 22B, and 22C, along portions of the periphery, leaving an open end 23 for insertion of product.

Figure 3:
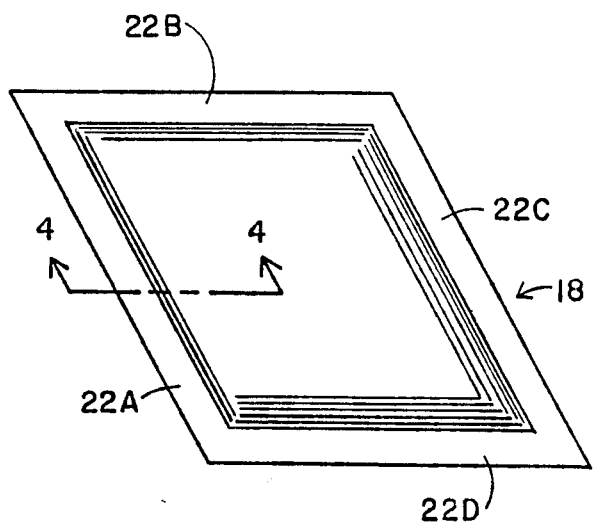
FIG. 3 is a closed and sealed package, and having product therein, the package being made with films of this invention.

FIG. 3 shows a pouch as in FIG. 2 with the open end 23 having been closed by the formation of the seal 22D.

Figure 4:
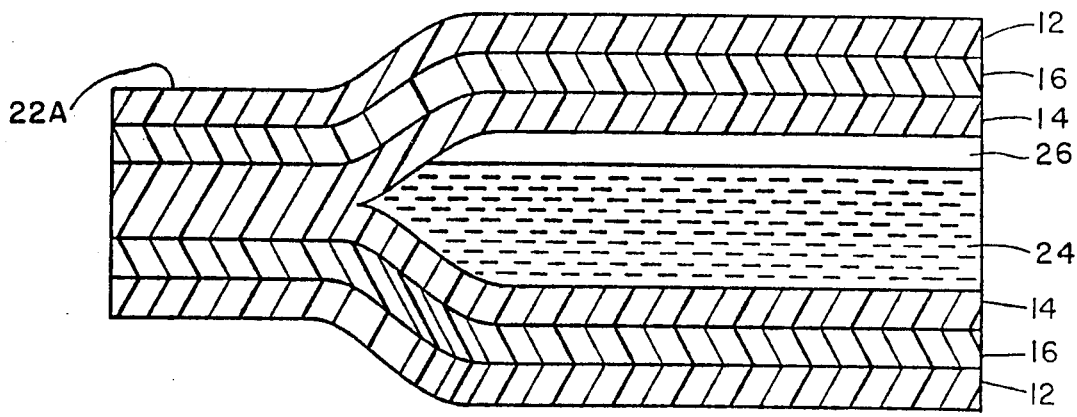
FIG. 4 is a cross-section taken at 4—4 of FIG. 3 and showing the relationship of the packaging materials, the product, and any enclosed air.

FIG. 4 shows a cross-section of the closed and sealed pouch of FIG. 3. Facing portions of the sheet materials on opposite sides of the pouch, are seen to be heat sealed together as indicated at 22A. The product 24 partially fills the package, leaving an unfilled space 26 which may be occupied by a gas such as air.

Returning now to the film itself it is seen that each of the layers must be capable of withstanding boiling temperatures in order for the film per se to survive the processing. Layer 12 is selected for its toughness. Layer 14 is selected for its capability to form strong heat seals which will remain strong throughout the process of the package being boiled, and being subjected to expansive stresses caused by expanding gases in the package. Layer 16 must have good adhesion to both layers 12 and 14, and must have enough heat resistance to withstand the boiling temperatures and still retain a good adhesion.

It has been found that the combination of properties required in the film is satisfied in a film where layer 12 is nylon 6 in an amount of about 30% of the thickness of the film. While lower fractions of nylon 6 may be acceptable, reduction to less than 20% of the thickness is not preferred because the overall strength of the package, as regards the capability to withstand the boiling temperatures, is unacceptably reduced. As the amount of nylon is increased over 30%, the extrusion process becomes more and more difficult until at about 40% the extrusion cannot be carried out with certain equipment. So the amount of nylon may range from about 20% to about 40% of the thickness of the film.

As regards performance properties of the sealant layer 14, and especially regarding its capability to withstand the boiling temperature, it is preferred that the layer 14 composition be 100% linear low density polyethylene. However, with use with the tubular water quench extrusion process which is preferred when the films of the invention are used to make the pouches disclosed herein for boiling purposes, use of 100% linear low density polyethylene for layer 14 gives rise to a difficulty in stabilizing the tubular extrusion bubble. The incorporation of low density polyethylene into the composition, however, lends stability to the bubble. So typically a fraction of the composition of layer 14 is low density polyethylene, with blend compositions up to about 50% by weight being preferred. Blend compositions over 50% are less capable of withstanding the boiling process temperatures, and so are not preferred, though up to 60% may be used.

The adhesive material in layer 16 is a carboxy modified linear low density polyethylene base material. One such material which is believed to be an anhydride modified linear low density polyethylene is sold by Mitsui Company of Japan under the tradename NF-500.

The films of this invention which are to be used to make boilable pouches are typically of the order of 2 to 3 mils thick. Substantially thinner films lack the strength to withstand the boiling temperatures. Substantially thicker films are less flexible, and thus may be cracked by the stress caused by gaseous expansion when the bag is boiled. Thicker films are, of course, also, economically speaking more expensive and thus not competitive. Within this framework layer 12 preferably represents 20% to 40% of the thickness of the film. Layer 16 is at least 10% and no more than about 20% of the film thickness. Layer 14 is at least 50% and no more than about 70% of the thickness of the film.

A fundamental problem addressed in the invention herein is that nylon 6 tends to become brittle when it is boiled, and yet a heat resistant polymer is necessary as at least one of the layers of the package. The inventors herein have discovered that, by oriented the film, the brittleness of the film, and notably, of the nylon 6 in boiling processes is overcome. The overall process then of making the films of the invention includes the process of coextruding the three layer film, preferably with a tubular water quench process, molecularly orienting the film, heat setting the film by conventional means, and cooling it. The orientation is preferably carried out as a stretch orientation wherein the film is oriented in a ratio of approximately 3 to 1, and within the range of 2.5 to 1 to 3.5 to 1. The stretch orientation process is taught in Super et al U.S. Pat. No. 4,501,797, herein incorporated by reference. It is contemplated that other orientation processes may also be usable.

Films of the invention may be made into packages either by sealing together facing portions of two separate sheets of the material, or by folding over a portion of the sheet material and heat sealing it to itself about a contiguous periphery in order to form a container as seen in FIG. 2. After the container is formed, the package may have product inserted therein through the open end 23. The pouch may then be evacuated and sealed, or air may be left in the pouch for cushioning purposed, or for other purposes. In cases where a substantial amount of air is left in the pouch, the boiling of the pouch causes the expansion, not only, of any water which may be contained in the pouch, which water turns into steam as boiling temperatures are approached, but also the expansion of any contained air. Significant stresses are placed on the pouch during the boiling operation by the combination of the steam, and air which may be left in the pouch. The pouch is susceptible to being ruptured during the boiling because of the pressure applied by this heated steam and air. And so a functional and performance test of pouches of the invention is provided by forming pouches from the film, filling them partially full with water, and sealing them leaving a substantial amount of air in the package along with the water. The sealed package is then boiled for 20 minutes at standard boiling temperatures and conditions. As the pouch internal temperature increases, the gaseous pressure inside the pouch increases as it expands, applying substantial force to the pouch, particularly at its seals. Pouches which burst or otherwise break or leak during the boiling processing, of course, are considered failures, and unacceptable. Pouches which survive the processing substantially intact are considered successful, and acceptable.

EXAMPLE 1

A three layer film was made by coextrusion, on tubular water quench extrusion processing equipment, of a three layer film. The outer layer of the tube was nylon 6. The inner layer of the tube was a blend of 50% linear low density polyethylene and 50% low density polyethylene. The intermediate layer was Mitsui's Admer NF-500 adhesive polymer. The coextruded film was water quenched at a temperature of 120° Fahrenheit and was wound up. The film was then slit and stretch oriented at a ratio of 3 to 1 in the machine direction. In the orientation process the nylon side of the film was heated at a temperature of approximately 90° Celsius and the polyethylene side of the film was heated at a temperature of approximately 90° Celsius immediately prior to the film being stretched. The film was then held at an elevated temperature of approximately 125° Celsius for a period of approximately 1 second to accomplish the heat setting of the film. The oriented film was about 2.5 mils thick. Portions of the heat set film were then formed into packages as seen in FIG. 2. The formed packages were 6 inches wide and 6 inches high and were filled with 0.25 liter of water and then closed leaving a substantial amount of air in the package. The closed and sealed packages were then boiled in water at atmospheric pressure for 20 minutes and the packages observed. Packages made according to the above described example all survived the boiling process without failure and substantially intact.

COMPARATIVE EXAMPLE 1

A film was formed as in Example 1 except that the outer layer was 20% nylon 6, the intermediate layer was 20% of the same adhesive as used in EXAMPLE 1, and the film was formed by the cast extrusion process. Approximate film thickness was 2.5 mils overall, after orienting, the same as in EXAMPLE 1. Pouches made from films of this Comparative Example burst during the boiling process.

COMPARATIVE EXAMPLE 2

Films were made as in Example 1 except that the film was formed by the cast extrusion process. Film thickness was approximately 2.5 mils overall, after orienting, the same as in EXAMPLE 1. Films made by this process burst during the boiling process.

Additional films were attempted substituting polypropylene for the nylon layer and substituting polyethylene terephthalate for the nylon layer. These films were formed according to cast coextrusion and tubular water quench coextrusion processes, but were not able to survive the boiling process.

Thus it is seen that the invention provides novel and economical films, of the order of 2 to 3 mils thickness, which have the capability of withstanding a boiling process while experiencing internal pressure exerted by steam and expanding hot air.

The invention further provides a method of packaging a production a sealed bag with an included quantity of air in the bag, wherein the subsequent boiling of the bag does not cause rupture of the bag; and wherein the thickness of the bag walls is of the order of 2 to 3 mils.

Having thus described the invention, what is claimed is:

1. A method of packaging a product, said method comprising the steps of:
    (a) coextruding a three layer film by tubular liquid quench process, said film comprising (i) a first layer of nylon 6, (ii) a second layer of a blend of linear low density polyethylene and low density polyethylene, wherein said low density polyethylene is present in said blend composition in an amount up to 50% by weight, and (iii) a third adhesive layer between said first and second layers;
    (b) molecularly orienting said three layer film;
    (c) heat setting said film;
    (d) sealing portions of said oriented and heat set film to each other in face to face relationship to form a package;
    (e) putting a product in said package;
    (f) sealing said package closed; and
    (g) boiling said package in water.

2. A method as in claim 1, said package having a low gaseous pressure therein, approximating atmospheric pressure, before boiling of said package.

* * * * *